(12) United States Patent
Yu et al.

(10) Patent No.: US 10,929,553 B2
(45) Date of Patent: Feb. 23, 2021

(54) MANAGING METHOD AND DEVICE FOR SENSOR ACCESS AUTHORITY

(71) Applicant: Beijing Zhigu Rui Tuo Tech Co., Ltd., Beijing (CN)

(72) Inventors: Kuifei Yu, Beijing (CN); Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 237 days.

(21) Appl. No.: 15/367,618

(22) Filed: Dec. 2, 2016

(65) Prior Publication Data
US 2017/0169242 A1 Jun. 15, 2017

(30) Foreign Application Priority Data
Dec. 15, 2015 (CN) .......................... 201510932767.2

(51) Int. Cl.
G06F 21/62 (2013.01)
(52) U.S. Cl.
CPC ........ G06F 21/6218 (2013.01); G06F 21/629 (2013.01); G06F 2221/2145 (2013.01)
(58) Field of Classification Search
CPC ........ G06F 21/629; G06F 21/62; G06F 21/70; G06F 21/82; G06F 21/83; G06F 21/84;
(Continued)

(56) References Cited

U.S. PATENT DOCUMENTS 8,856,859 B2* 10/2014 Kirkup .................... G06F 21/53
713/152
9,058,096 B2* 6/2015 Kasten .................. G06F 11/328
(Continued)

FOREIGN PATENT DOCUMENTS

| CN | 102946648 A | 2/2013 |
|----|-------------|--------|
| CN | 103258162 A | 8/2013 |
| JP | 2629220 B1  | 1/2016 |

OTHER PUBLICATIONS

Michalevsky, Y. et al., "Gyrophone: Recognizing Speech from Gyroscope Signals," 23rd USENIX Security Symposium, Aug. 20, 2014, p. 1053-1067 (16 pages).
(Continued)

*Primary Examiner* — Zachary A. Davis
(74) *Attorney, Agent, or Firm* — Sheppard Mullin Richter & Hampton LLP

(57) ABSTRACT

The application provides a managing method and device for a sensor access authority, and relates to the field of information security. The method includes: determining a second sensor corresponding to a first sensor and having a type different from the first sensor in response to adjustment of an access authority of an application program to the first sensor, and then adjusting the access authority of the application program to the second sensor. The second sensor corresponding to a first sensor is determined when an access authority of an application program to the first sensor is adjusted, and the access authority of the application program to the second sensor is adjusted, thereby avoiding the second sensor collecting and leaking privacy information of the user and protecting privacy security of the user.

14 Claims, 3 Drawing Sheets

(58) Field of Classification Search
CPC ............. G06F 21/85; G06F 2221/2145; G06F 2221/2149; G06F 21/6218
See application file for complete search history.

(56) References Cited

U.S. PATENT DOCUMENTS

| | | | | |
|---|---|---|---|---|
| 9,424,409 | B2* | 8/2016 | Buck | G06F 21/31 |
| 9,507,967 | B2* | 11/2016 | Wurster | G06F 21/75 |
| 9,568,977 | B2* | 2/2017 | Ding | G06F 1/325 |
| 9,836,596 | B2* | 12/2017 | Poiesz | G06F 21/52 |
| 9,948,492 | B2* | 4/2018 | Jung | H04L 41/5054 |
| 9,973,505 | B2* | 5/2018 | Lee | H04L 63/101 |
| 10,032,037 | B1* | 7/2018 | Allen | G06F 21/6245 |
| 2009/0320143 | A1* | 12/2009 | Gear | G06F 9/468 726/29 |
| 2012/0254878 | A1* | 10/2012 | Nachman | G06F 9/5094 718/102 |
| 2015/0120641 | A1* | 4/2015 | Soon-Shiong | G06N 5/04 706/52 |
| 2016/0232365 | A1* | 8/2016 | Oh | G06F 21/51 |
| 2017/0235469 | A1* | 8/2017 | Schieman | G06F 9/5055 715/738 |
| 2017/0329966 | A1* | 11/2017 | Koganti | G06F 21/554 |
| 2019/0163544 | A1* | 5/2019 | Ekambaram | H04L 63/0428 |

OTHER PUBLICATIONS

"New Imaging Device That Is Flexible, Flat, and Transparent," The Optical Society (OSA), downloaded Mar. 29, 2019, retrieved from: https://www.osa.org/en-u/about_osa/newsroom/news_releases/2013/new_imaging_device_that_is_flexible,_flat_and_tra/ (3 pages).

Fraunhofer, Bidirectional SVGA Microdisplay, downloaded Mar. 29, 2019, retrieved from: https://www.fep.fraunhofer.de/content/dam/fep/en/documents/Produktflyer/L03_Bidirectional%20SVGA%20microdisplay_EN_net.pdf (2 pages).

Baumgarten, J. et al., "Aspects of a Head Mounted Eyetracker based on a bidirectional OLED microdisplay," IMID 2011 Digest, 2011, p. 178-179 (2 pages).

He, W. et al., "WiG: WiFi-based Gesture Recognition System," IEEE, 2015 (7 pages).

Fulare, Rashmi R and Sakhare, Am. "Efficient Sensor Node Authentication in Wireless Integrated Sensor Networks Using Virtual Certificate Authority," 2014 Fourth International Conference on Communication Systems and Network Technologies IEEE, 2014, p. 724-728.

Wu, Jingzheng et al., "A New Mitigation Approach for Covert Channel of Android Operation System Based on Jermission Mechanism," Journal of University of Chinese Academy of Sciences, Sep. 2015, vol. 32, No. 5, pp. 667-675. [English Abstract].

* cited by examiner

MANAGING METHOD AND DEVICE FOR SENSOR ACCESS AUTHORITY

CROSS REFERENCE TO RELATED APPLICATION

The present disclosure is based on and claims the benefit of priority to Chinese Application No. 201510932767.2, filed on Dec. 15, 2015, the entire contents of which are incorporated herein by reference.

BACKGROUND OF THE DISCLOSURE

Technical Field

The present disclosure relates to the technical field of information security, in particular to a managing method and device for a sensor access authority.

Related Art

As more and more types of sensors are embedded into electronic devices such as a smart phone, the electronic devices have higher and higher environment information (including user information) sensing capability. For example, by a microphone array, the devices can obtain voices from different directions; a current position of the user can be obtained by a global position system (GPS) system; a movement mode of the user can be obtained by a three dimensional (3D) accelerometer and a gyroscope; and body temperature of the user can be obtained by a temperature sensor. These sensors give superhigh user privacy capability to the electronic devices, and a greater risk is brought to the privacy protection of the user.

In order to protect user privacy data, current mobile operating system platforms (IOS, ANDROID, etc.) provide a corresponding authorization mechanism: an application program to be mounted needs to apply an access authority to data collected by a corresponding sensor on the device for the user, and the application program can access to the data collected by the sensor by only obtaining the authorization from the user.

However, along with the rapid development of a sensor technology, a sampling precision and a sampling rate of the sensor are improved by different degrees. In such a case, the existing authorization mechanism cannot effectively protect the security of private data of the user.

SUMMARY

The present disclosure aims to provide a managing method and device for a sensor access authority, so as to improve the security of user privacy.

According to a first aspect of at least one embodiment of the present disclosure, there is provided a managing method for a sensor access authority. The method comprises:

determining a second sensor corresponding to a first sensor and having a type different from the first sensor in response to adjustment of an access authority of an application program to the first sensor; and adjusting the access authority of the application program to the second sensor.

According to a second aspect of at least one embodiment of the present disclosure, there is provided a managing device for a sensor access authority. The device comprises:

a determining module, configured to determine a second sensor corresponding to a first sensor and having a type different from the first sensor in response to adjustment of an access authority of an application program to the first sensor; and an adjusting module, configured to adjust the access authority of the application program to the second sensor.

According to a third aspect of at least one embodiment of the present disclosure, there is provided user equipment, comprising:

a memory, configured to store an instruction;

a processor, configured to execute the instruction stored by the memory, wherein when executed, the instruction causes the processor to perform the following operations:

determining a second sensor corresponding to a first sensor and having a type different from the first sensor in response to adjustment of an access authority of an application program to the first sensor; and adjusting the access authority of the application program to the second sensor.

According to the method and device of embodiments of the present disclosure, a second sensor corresponding to a first sensor is determined when an access authority of an application program to the first sensor is adjusted, and the access authority of the application program to the second sensor is adjusted, thereby avoiding the second sensor collecting and leaking privacy information of the user and protecting privacy security of the user.

DETAILED DESCRIPTION

In combination with the drawings and embodiments, specific embodiments of the present disclosure are further described in detail. The following embodiments are used for explaining the present disclosure rather than limiting a scope of the present disclosure.

It should be understood by a person skilled in the art that in various embodiments of the present disclosure, the value of the serial number of each step described above does not mean an execution sequence, and the execution sequence of each step should be determined according to the function and internal logic thereof, and should not be any limitation on the implementation procedure of the embodiments of the present disclosure.

Sensors are detection apparatuses, and different types of sensors are used for detecting different types of information. Therefore, the sensors can be classified according to their different functions, for example, a photosensitive sensor (or an image sensor) for detecting an optical signal, an acoustic sensor for detecting a voice signal, a gas sensor for detecting odor, a temperature sensor for detecting temperature, a movement sensor for detecting a movement state, etc. Each type of the sensors is designed to perform a specific function, that is, to detect certain type of information. However, along with advancement of technology, the inventor found that the sensor originally for detecting certain type of information also has a capability of detecting another type of information. For example, the gyroscope originally for detecting angular speed information in movement also has a capability of detecting voice with the improvement of its sampling rate and sampling precision. As a result, voice information of the user may be collected by the gyroscope without knowing, and further privacy leakage is caused. The method in the present disclosure is to overcome the risk of privacy leakage.

Figure 1:
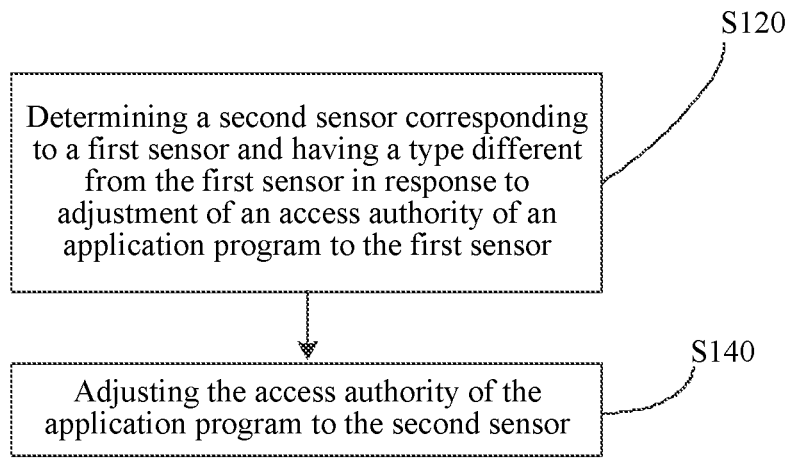
FIG. 1 is a flow drawing of a managing method for a sensor access authority according to one embodiment of the present disclosure.

FIG. 1 is a flow drawing of a managing method for a sensor access authority according to one embodiment of the present disclosure, and the method can be implemented in, for example, an information processing device. As shown in FIG. 1, the method comprises:

S120: determining a second sensor corresponding to a first sensor and having a type different from the first sensor in response to adjustment of an access authority of an application program to the first sensor; and S140: adjusting the access authority of the application program to the second sensor.

According to the method of the embodiments of the present disclosure, a second sensor corresponding to a first sensor and having a type different from the first sensor is determined in response to adjustment of an access authority of an application program to the first sensor; and then the access authority of the application program to the second sensor is adjusted. The method can determine the second sensor corresponding to the first sensor when an access authority of an application program to the first sensor is adjusted, and adjust the access authority of the application program to the second sensor, thereby avoiding the second sensor collecting and leaking privacy information of the user and protecting privacy security of the user.

The functions of steps S120 and S140 are described in detail by combining with specific embodiments.

In the step S120, the adjustment of an access authority of an application program to the first sensor can be a fact that the user adjusts the access authority of the application program to the first sensor, or the operating system of an electronic device automatically adjusts the access authority of the application program to the first sensor.

The adjustment can be, for example, forbidding. That is, allowing the access authority of the application program to the first sensor is switched to forbidding the access authority of the application program to the first sensor. Of course, the adjustment can be reverse operation of the above operation. That is, forbidding the access authority of the application program to the first sensor is switched to allowing the access authority of the application program to the first sensor. For the purpose of simplicity, the present disclosure mainly takes the adjusting being the forbidding as an example for description.

A corresponding relation between the first sensor and the second sensor lies in that the second sensor can at least partially detect the information detected by the first sensor, or can at least partially realize the functions of the first sensor.

Meanwhile, the first sensor and the second sensor are two different types of sensors. That is, the first sensor and the second sensor are originally used for detecting different types of information, or the first sensor and the second sensor are originally designed for detecting different types of information.

In one embodiment, the first sensor can comprise a microphone and the corresponding second sensor can comprise a gyroscope. It is well known that the microphone is used for detecting a voice, the gyroscope is mainly used for detecting an angular speed, and the two belong to two different types of sensors. However, after the sampling rate and sampling precision of the gyroscope are improved, it can be used for collecting a voice signal, and therefore, the microphone and the gyroscope meet the above corresponding relation.

In another embodiment, the first sensor can comprise a fingerprint sensor and the corresponding second sensor can comprise an image sensor. For example, the second sensor can be a camera array embedded in a touch screen. It is well known that the fingerprint sensor is used for detecting a fingerprint, the image sensor is mainly used for imaging, and the two belong to two different types of sensors. However, after the sampling rate and sampling precision of the image sensor are improved, it can be used for detecting the fingerprint, and therefore, the fingerprint sensor and the image sensor meet the above corresponding relation.

In another embodiment, the first sensor can comprise a depth sensor and the second sensor can comprise an antenna. It is well known that the depth sensor is used for detecting a user gesture, and the antenna is mainly used for detecting a wireless signal. However, after the sampling rate and sampling precision of the antenna are improved, it can be used for identifying the gesture by detecting the disturbance of the gesture on a wireless signal, and therefore, the depth sensor and the antenna meet the above corresponding relation.

Those skilled in the art should understand that the above embodiments only give some examples of the first sensor and the second sensor. With the development of the sensor technology, especially the improvement of the sampling rate and sampling precision of the sensors, more and more sensors will meet the corresponding relation. In order to rapidly determine the second sensor corresponding to the first sensor, in one embodiment, the method can further comprise:

a first sub-step: determining a corresponding relation between the first sensor and the second sensor.

In the present disclosure, the corresponding relation between the first sensor and the second sensor can be determined in advance by an experiment, and a corresponding relation table between the first sensor and the second sensor as shown in table 1 can be determined in advance. Further, in the step S120, the second sensor corresponding to the first sensor can be rapidly determined in a table checking manner, thereby improving the processing speed.

TABLE 1

| First sensor | Second sensor |
| --- | --- |
| Microphone | Gyroscope |
| Fingerprint sensor | Image sensor |
| Depth sensor | Antenna |
| . . . | . . . |

In the step S140, the access authority of the application program to the second sensor can be adjusted based on the adjustment on the access authority to the first sensor in the step S120. Specifically, the aim of adjusting the access authority of the application program to the first sensor in the step 120 should be consistent with the aim of adjusting the access authority of the application program to the second sensor in the step. The step can be executed by the operating system of an electronic device, or executed in response to the authorization of the user by outputting a prompt message to the user firstly.

In one embodiment, in the step S120, the access authority of the application program to the first sensor is forbidden. It can be determined that the adjusting aim is to forbid the access to the data collected by the first sensor. Therefore, in the step, the adjusting the access authority of the application program to the second sensor can comprise: forbidding access of the application program to the data collected by the second sensor. As the abovementioned, the data collected by the second sensor may be partially overlapped with the data collected by the first sensor, therefore, in the above step S120, in the case of forbidding access of the application program to the data collected by the first sensor, if the access of the application program to the data collected by the second sensor is allowed, the overlapped data may be accessed and leaked. Thus, in the step, the access of the application program to the data collected by the second sensor is further forbidden.

As the abovementioned, the reason that the second sensor can collect the data at least partially overlapped with the data collected by the first sensor is that the sampling rate and/or the sampling precision of the sensor are/is obviously improved. Therefore, in order to avoid accessing to and leaking the data collected by the first sensor, the adjusting the access authority of the application program to the second sensor can comprise: forbidding access of the application program to the data collected by the second sensor based on a sampling rate higher than a first threshold value and a sampling precision higher than a second threshold value. By the arrangement, the application program cannot access to the data collected by the second sensor based on a sampling rate higher than the first threshold value and a sampling precision higher than the second threshold value, and it cannot indirectly obtain the partially overlapped data. In the meantime, the application program can still access to the data collected by the second sensor based on a sampling rate smaller than or equal to the first threshold value and a sampling precision smaller than or equal to the second threshold value.

In order to forbid the access of the application program to the data collected by the second sensor based on a sampling rate higher than the first threshold value and a sampling precision higher than the second threshold value, in one embodiment, the sampling rate of the second sensor can be directly arranged to be smaller than or equal to the first threshold value. However, after such arrangement, if other application programs are also in an operating state, as a result, other application programs cannot access to the data collected by the second sensor based on a sampling rate higher than the first threshold value, and the normal operation of other application programs may be affected.

In one embodiment, the method can also comprise:

a second sub-step: reducing the sampling rate of the data collected by the second sensor to be smaller than or equal to the first threshold value.

In the present embodiment, the data collected by the second sensor can be subjected to the processing of reducing the sampling rate. The first threshold value can be set according to application needs. For example, assuming that the second sensor is a gyroscope, the first threshold value can be, for example, 190 Hz. When the sampling of the collected data is lower than or equal to 190 Hz, voice information cannot be obtained therefrom. Assuming that the initial sampling rate of the gyroscope is 380 Hz, if the data of half of sampling points are extracted from the data in a manner of extracting one sampling point from every two sampling points (for example, the data of the first, third, fifth, seventh sampling points are extracted), then the sampling rate of the data after processing is 190 Hz. Similarly, if the data of one third of sampling points are extracted from the data in a manner of extracting one sampling point from every three sampling points, for example, then the sampling rate of the data after processing is 127 Hz. Therefore, in the embodiment, in response to the forbidding access of the application program to the data collected by the second sensor based on a sampling rate higher than a first threshold value and a sampling precision higher than a second threshold value, the sampling rate of the data collected by the second sensor can be reduced to be smaller than or equal to the first threshold value by processing, and the application program is allowed to access the processed data, thereby ensuring that the application program cannot obtain the data that the two sensors can collect in an overlapping way. Still, the first sensor being the microphone and the second sensor being the gyroscope are taken as an example, and processing of such step ensures that the application program cannot obtain the voice information from the processed data.

In another embodiment, the method can also comprise:

a third sub-step: reducing the sampling precision of the data collected by the second sensor to be smaller than or equal to the second threshold value.

In the present embodiment, the data collected by the second sensor can be subjected to the processing of reducing the sampling precision. The second threshold value can be set according to application needs. For example, assuming that the second sensor is a gyroscope, the second threshold value can be for example, 15 bit. When the sampling precision is smaller than or equal to 15 bit, the voice information cannot be obtained therefrom. Assuming that the initial sampling rate of the gyroscope is 17 bit, that is, the sampling information is divided into $2^{17}$ levels, if the data are processed in a manner of combining every four levels into one level, then the sampling precision of the data after processing is 15 bit. Similarly, if the data are processed in a manner of combining every sixteen levels into one level, then the sampling precision of the data after processing is 13 bit. Therefore, in the embodiment, in response to the forbidding access of the application program to the data collected by the second sensor based on a sampling rate higher than a first threshold value and a sampling precision higher than a second threshold value, the sampling precision of the data collected by the second sensor can be reduced to be smaller than or equal to the second threshold value by processing, and the application program is allowed to access the processed data, thereby ensuring that the application program cannot obtain the data that the two sensors can collect in an overlapping way. Still, the first sensor being the microphone and the second sensor being the gyroscope are taken as an example, and processing of such step ensures that the application program cannot obtain the voice information from the processed data.

Besides, along the progress of the sensor technology, for the adjusting the access authority of the application program to the data collected by the first sensor, besides the forbidding or allowing the access authority of the application program to the data collected by the first sensor, it also can be that the access authority of the application program only to the first sensor is forwardly adjusted or reversely adjusted between the forbidding and allowing. The forward adjusting is to allow the application program to access to the data collected by the first sensor based on a higher sampling rate and/or a higher sampling precision. Reverse adjusting is opposite to the forward adjusting.

In such a case, the access authority of the application program only to the second sensor can be adjusted in a same direction. For example, in the step S120, in the case that the application program is adjusted to only access to a voice signal with a lower sampling precision collected by the microphone, then in the step S140, the application program is adjusted to only access to the data with a lower sampling precision collected by the gyroscope. That is to say, in such an embodiment, the adjustment on the access authority of the application program to the first sensor or the second sensor can be multilevel adjustment.

In addition, the inventor also found that an information identifying rate can be improved by combining the information collected by multiple similar sensors. Therefore, the quantity of the same type of sensors on the electronic device also affect the setting of the first threshold value. For example, there are two smart phones including a first smart phone and a second smart phone. The first smart phone has one gyroscope, and the second smart phone has two gyroscopes. Specifically, the more the quantity of the sensors, the lower the first threshold value is. For the first smart phone, when its sampling rate is set to be 190 Hz, the first smart phone cannot collect the voice signal; while the second smart phone cannot collect the voice signal by only setting its sampling rate to be 150 Hz as required.

In the above embodiment, the first sensor has a single detection function, and the second sensor has at least two detection functions. Therefore, the access authority of the application program to the data collected by the first sensor is adjusted according to the user or operating system, such that the adjusting aim of the user or operating system can be judged accurately, and further the access authority of the application program to the data collected by the second sensor is adjusted adaptively. By taking the case that the user forbids the access of the application program to the microphone as an example, it can be determined that the user does not want the application program to collect voice information. However, if the first sensor has at least two detection functions, adjustment of the access authority of the application program to the data collected by the first sensor may not be performed as direct as the foresaid embodiment. However, through manners of training the user, etc., the adjusting aim of the user or operating system can be judged according to a corresponding strategy. For example, if the user forbids the access of the application program to the data collected by the gyroscope based on a sampling rate higher than the first threshold value and a sampling precision higher than the second threshold value, it still can be judged that the user does not want the gyroscope to collect the voice information at present, but still wants the gyroscope to collect angular speed information, thereby, further forbidding the access of the application program to the data collected by the microphone.

Those skilled in the art can understand that the first sensor and the second sensor can have more than one detection function. The key is that the user or operating system can adjust the access authority of the application program to the data collected by the first sensor, such that the adjusting is determined, and further the access authority of the application program to the data collected by the second sensor is adjusted.

In addition, the embodiments of the present disclosure also provide a computer readable medium, comprising a computer readable instruction which is executed to execute the following operations: the operations in the steps S120 and S140 of the method in the embodiment as shown in FIG. 1.

In conclusion, the method of the present disclosure can automatically remind the user of adjusting the access authority of the application program to another non-similar sensor in a case that the user or operating system adjusts the access authority of the application program to one sensor, thereby avoiding leaking and collecting the privacy information of the user by the other sensor, and improving privacy safety of the user.

Figure 2:
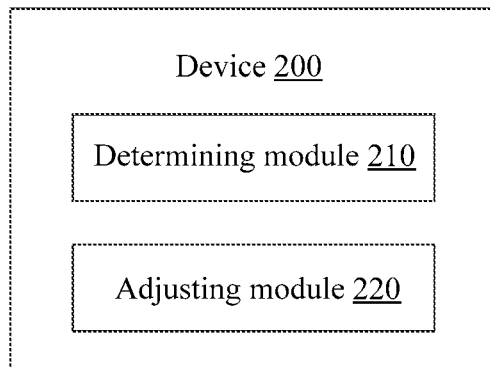
FIG. 2 is a structural schematic drawing of modules of a managing device for a sensor access authority according to one embodiment of the present disclosure.

FIG. 2 is a structural schematic drawing of modules of a managing device for a sensor access authority according to one embodiment of the present disclosure. The managing device for a sensor access authority can serve as a function module in a smart phone, a tablet computer, a smart bracelet and other devices, and can also serve as an independent device to communicate with other electronic devices to realize corresponding functions. The device 200 can comprise:

a determining module 210, configured to determine a second sensor corresponding to a first sensor and having a type different from the first sensor in response to adjustment of an access authority of an application program to the first sensor; and an adjusting module 220, configured to adjust the access authority of the application program to the second sensor.

According to the device of the embodiments of the present disclosure, a second sensor corresponding to a first sensor and having a type different from the first sensor is determined in response to adjustment of an access authority of an application program to the first sensor; and then the access authority of the application program to the second sensor is adjusted. The device determines the second sensor corresponding to the first sensor when an access authority of an application program to the first sensor is adjusted, and adjusts the access authority of the application program to the second sensor, thereby avoiding the second sensor collecting and leaking privacy information of the user and protecting privacy security of the user.

Specific embodiments are combined to describe the determining module 210 and functions of the determining module 210 in detail.

The adjusting module 210 is configured to determine a second sensor corresponding to a first sensor and having a type different from the first sensor in response to adjustment of an access authority of an application program to the first sensor.

The adjustment of an access authority of an application program to the first sensor can be a fact that the user adjusts the access authority of the application program to the first sensor, or the operating system of an electronic device automatically adjusts the access authority of the application program to the first sensor.

The adjustment can be, for example, forbidding, that is, allowing the access authority of the application program to the first sensor is switched to forbidding the access authority of the application program to the first sensor. Of course, the adjustment can be reverse operation of the above operation, that is, forbidding the access authority of the application program to the first sensor is switched to allowing the access authority of the application program to the first sensor. For the purpose of simplicity, the present disclosure mainly takes the adjusting being the forbidding as an example for description.

A corresponding relation between the first sensor and the second sensor lies in that the second sensor can at least partially detect the information detected by the first sensor, or can at least partially realize the functions of the first sensor.

Meanwhile, the first sensor and the second sensor are two different types of sensors, that is, the first sensor and the second sensor are originally used for detecting different types of information, or the first sensor and the second sensor are originally designed for detecting different types of information.

In one embodiment, the first sensor can comprise a microphone and the corresponding second sensor can comprise a gyroscope. It is well known that the microphone is used for detecting a voice, the gyroscope is mainly used for detecting an angular speed, and the two belong to two different types of sensors. However, after the sampling rate and sampling precision of the gyroscope are improved, it can be used for collecting a voice signal, and therefore, the microphone and the gyroscope meet the above corresponding relation.

In another embodiment, the first sensor can comprise a fingerprint sensor and the corresponding second sensor can comprise an image sensor, for example, the second sensor can be a camera array embedded in a touch screen. It is well known that the fingerprint sensor is used for detecting a fingerprint, the image sensor is mainly used for imaging, and the two belong to two different types of sensors. However, after the sampling rate and sampling precision of the image sensor are improved, it can be used for detecting the fingerprint, and therefore, the fingerprint sensor and the image sensor meet the above corresponding relation.

In another embodiment, the first sensor can comprise a depth sensor and the second sensor can comprise an antenna. It is well known that the depth sensor is used for detecting a user gesture, and the antenna is mainly used for detecting a wireless signal. However, after the sampling rate and sampling precision of the antenna are improved, it can be used for identifying the gesture by detecting the disturbance of the gesture on a wireless signal, and therefore, the depth sensor and the antenna meet the above corresponding relation.

Figure 3:
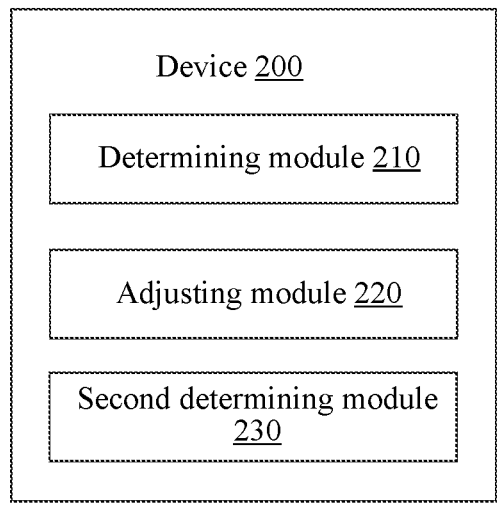
FIG. 3 is a structural schematic drawing of modules of a managing device for a sensor access authority according to another embodiment of the present disclosure.

Those skilled in the art should understand that the above embodiments only give some examples of the first sensor and the second sensor. With the development of the sensor technology, especially the improvement of the sampling rate and sampling precision of the sensors, more and more sensors will meet the corresponding relation. In order to rapidly determine the second sensor corresponding to the first sensor, in one embodiment, refer to FIG. 3, the device can further comprise:

a second determining module 230, configured to determine a corresponding relation between the first sensor and the second sensor.

The corresponding relation between the first sensor and the second sensor can be determined in advance by an experiment, and a corresponding relation table between the first sensor and the second sensor as shown in table 1 can be determined in advance. Further, the determining module 210 can further determine the second sensor corresponding to the first sensor in a table checking manner, thereby improving the processing speed.

The adjusting module 220 is configured to adjust the access authority of the application program to the second sensor.

The adjusting module 220 can adjust the access authority of the application program to the second sensor based on the adjustment on the access authority to the first sensor. Specifically, the aim of adjusting the access authority of the application program to the first sensor by a user or operating system should be consistent with the aim of adjusting the access authority of the application program to the second sensor. Specifically, the adjusting module 220 can be triggered by an instruction of the operating system to execute the adjusting operation, or execute the adjusting operation in response to the authorization of the user by outputting a prompt message to the user from a corresponding action device firstly.

In one embodiment, the access authority of the application program to the first sensor is forbidden in response to the user or operating system, and it can be determined that the adjusting aim is to forbid the access to the data collected by the first sensor. Therefore, the adjusting module can forbid the access of the application program to the data collected by the second sensor. As the abovementioned, the data collected by the second sensor may be partially overlapped with the data collected by the first sensor. Therefore, in the case that the user or operating system forbids the access of the application program to the data collected by the first sensor, if the access of the application program to the data collected by the second sensor is allowed, the overlapped data may be accessed and leaked. Thus, the adjusting module 220 further forbids the access of the application program to the data collected by the second sensor.

As the abovementioned, the reason that the second sensor can collect the data at least partially overlapped with the data collected by the first sensor is that the sampling rate and/or the sampling precision of the sensor are/is obviously improved. Therefore, in order to avoid accessing to and leaking the data collected by the first sensor, the adjusting module 220 can forbid the access of the application program to the data collected by the second sensor based on a sampling rate higher than a first threshold value and a sampling precision higher than a second threshold value. By the arrangement, the application program cannot access to the data collected by the second sensor based on a sampling rate higher than the first threshold value and a sampling precision higher than the second threshold value, and it cannot indirectly obtain the partially overlapped data; in the meantime, the application program can still access to the data collected by the second sensor based on a sampling rate smaller than or equal to the first threshold value and a sampling precision smaller than or equal to the second threshold value.

In order to forbid the access of the application program to the data collected by the second sensor based on a sampling rate higher than the first threshold value and a sampling precision higher than the second threshold value, in one embodiment, the sampling rate of the second sensor can be directly arranged to be smaller than or equal to the first threshold value. However, after such arrangement, if other application programs are also in an operating state, as a result, other application programs cannot access to the data collected by the second sensor based on a sampling rate higher than the first threshold value, and the normal operation of other application programs may be affected.

Figure 4:
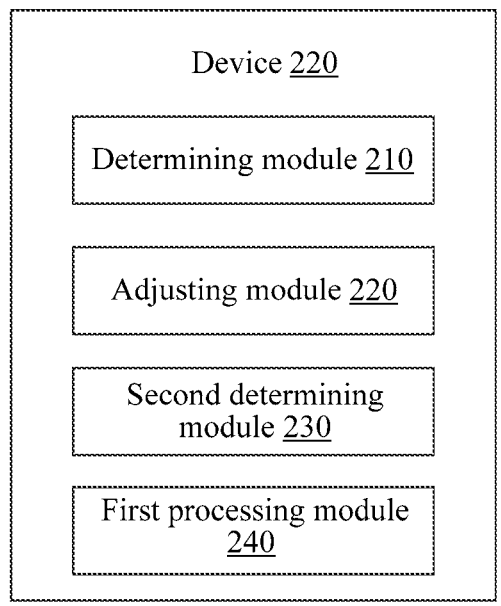
FIG. 4 is a structural schematic drawing of modules of a managing device for a sensor access authority according to a further embodiment of the present disclosure.

In one embodiment, refer to FIG. 4, the device 200 can also comprise:

a first processing module 240, configured to reduce the sampling rate of the data collected by the second sensor to be smaller than or equal to the first threshold value.

In the present embodiment, the first processing module 240 can perform the processing of reducing the sampling rate on the data collected by the second sensor. The first threshold value can be set according to application needs. For example, assuming that the second sensor is a gyroscope, the first threshold value can be for example, 190 Hz, when the sampling of the collected data is lower than or equal to 190 Hz, voice information cannot be obtained therefrom.

Figure 5:
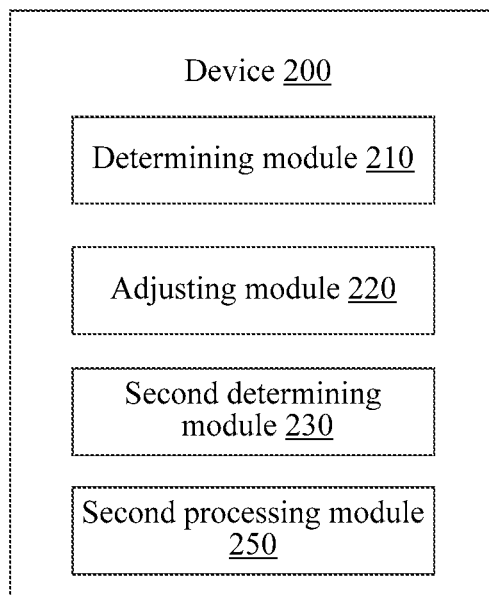
FIG. 5 is a structural schematic drawing of modules of a managing device for a sensor access authority according to a further embodiment of the present disclosure.

In one embodiment, refer to FIG. 5, the device 200 can also comprise:

a second processing module 250, configured to reduce the sampling precision of the data collected by the second sensor to be smaller than or equal to the second threshold value.

In the present embodiment, the second processing module 250 can perform the processing of reducing the sampling precision on the data collected by the second sensor. The second threshold value can be set according to application needs. For example, assuming that the second sensor is a gyroscope, the second threshold value can be for example, 15 bit. When the sampling precision is smaller than or equal to 15 bit, the voice information cannot be obtained therefrom.

Besides, along the progress of the sensor technology, for the adjusting the access authority of the application program to the data collected by the first sensor, besides the forbidding or allowing the access authority of the application program to the data collected by the first sensor, it also can be that the access authority of the application program only to the first sensor is forwardly adjusted or reversely adjusted between the forbidding and allowing. The forward adjusting is to allow the application program to access to the data collected by the first sensor based on a higher sampling rate and/or a higher sampling precision. Reverse adjusting is opposite to the forward adjusting.

In such a case, the adjusting module 220 can adjust the access authority of the application program to the second sensor in a same direction. For example, in the case that the application program is adjusted to only access to a voice signal with a lower sampling precision collected by the microphone, the adjusting module 220 can adjust the application program to only access to the data with a lower sampling precision collected by the gyroscope. That is to say, in such embodiment, the adjustment on the access authority of the application program to the first sensor or the second sensor can be multilevel adjustment.

In addition, the inventor also found that an information identifying rate can be improved by combining the information collected by multiple similar sensors, therefore, the quantity of the same type of sensors on the electronic device also affect the setting of the first threshold value. Specifically, the more the quantity of the sensors, the lower the first threshold value is.

In the above embodiment, the first sensor has a single detection function, and the second sensor has at least two detection functions. Therefore, the access authority of the application program to the data collected by the first sensor is adjusted according to the user or operating system, such that the adjusting aim of the user or operating system can be judged accurately, and further the access authority of the application program to the data collected by the second sensor is adjusted adaptively. By taking the case that the user forbids the access of the application program to the microphone as an example, it can be determined that the user does not hope the application program to collect voice information. However, if the first sensor has at least two detection functions, adjustment of the access authority of the application program to the data collected by the first sensor may not be performed as direct as the foresaid embodiment. However, through manners of training the user, etc., the adjusting aim of the user or operating system can be judged according to a corresponding strategy. For example, if the user forbids the access of the application program to the data collected by the gyroscope based on a sampling rate higher than the first threshold value and a sampling precision higher than the second threshold value, it still can be judged that the user does not hope the gyroscope to collect the voice information at present, but still hopes the gyroscope to collect angular speed information, thereby, further forbidding the access of the application program to the data collected by the microphone.

Those skilled in the art can understand that the first sensor and the second sensor can have more than one detection function. The key is that the user or operating system can adjust the access authority of the application program to the data collected by the first sensor, such that the adjusting is determined, and further the access authority of the application program to the data collected by the second sensor is adjusted.

In conclusion, the device of the present disclosure can automatically remind the user of adjusting the access authority of the application program to another non-similar sensor in a case that the user or operating system adjusts the access authority of the application program to one sensor, thereby avoiding leaking and collecting the privacy information of the user by the another sensor, and improving privacy safety of the user.

One application scenario of the method and device of the embodiments of the present disclosure is as follows: a user A joins a company top meeting involving trade secrets. During the meeting, the user A needs to use an application program on a mobile phone to display some pictures to other persons in the meeting. In order to avoid leaking a speech of the persons in the meeting, the user A forbids the access authority of the application program to a microphone on the mobile phone. Then the mobile phone pops out a message to remind the user A of switching off the access authority of the application program to the gyroscope on the mobile phone or not, and that the gyroscope can also collect voice information in a current working state. The user A timely switches off the access authority of the application program to the gyroscope according to the reminder.

Figure 6:
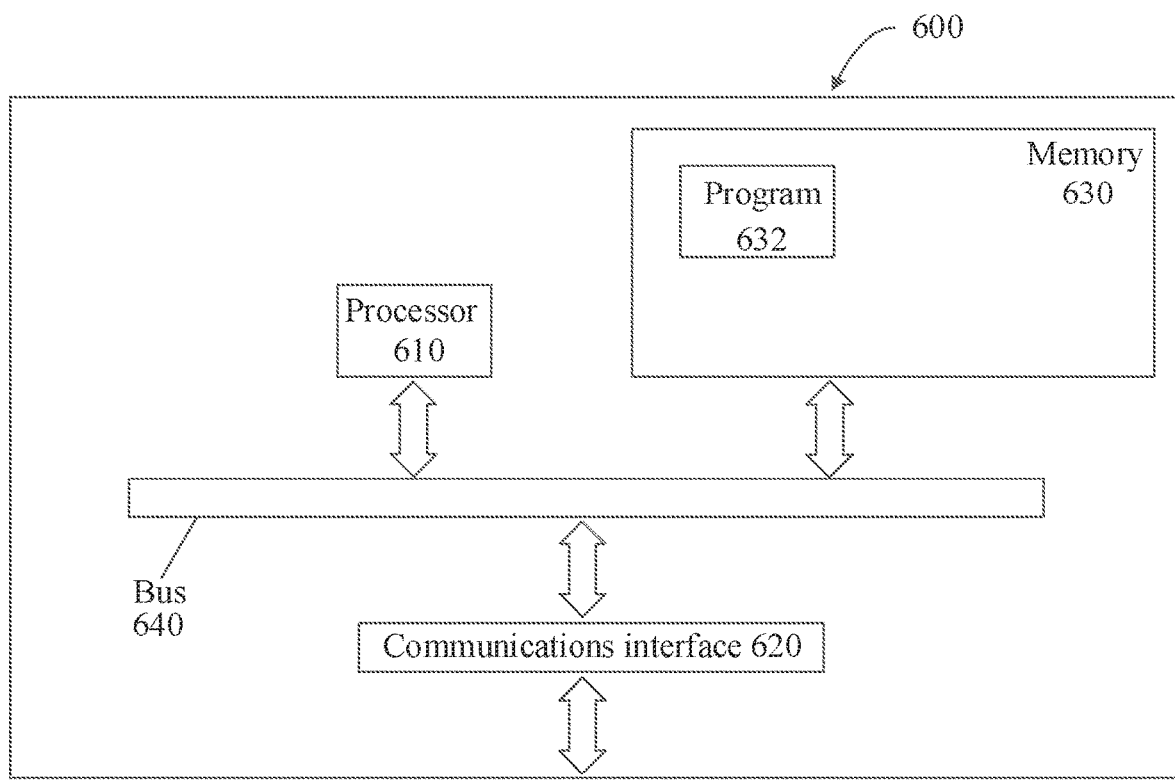
FIG. 6 is a structural schematic drawing of hardware of user equipment according to another embodiment of the present disclosure.

FIG. 6 shows a structural schematic drawing of hardware of user equipment according to another embodiment of the present disclosure. The specific embodiments of the present disclosure do not limit specific implementing of the user equipment, refer to FIG. 6, the user equipment 600 can comprise: a processor 610, a communications interface 620, a memory 630, and a communications bus 640.

The processor 610, the communications interface 620, and the memory 630 communicate with each other by using the communications bus 640.

The communications interface 620 is configured to communicate with a network element such as a client.

The processor 610 is configured to execute a program 632, and specifically can implement relevant steps in the method embodiment shown in FIG. 1.

Specifically, the program 632 may comprise program code, where the program code comprises a computer operation instruction.

The processor 610 may be a central processing unit (CPU), or an application specific integrated circuit (ASIC), or may be configured as one or more integrated circuits that implement the embodiments of the present disclosure.

The memory 630 is configured to store the program 632. The memory 630 may comprise a high speed random access memory (RAM), and may also comprise a non-volatile memory such as at least one magnetic disk storage. The program 632 may specifically execute the following steps:

determining a second sensor corresponding to a first sensor and having a type different from the first sensor in response to adjustment of an access authority of an application program to the first sensor; and adjusting the access authority of the application program to the second sensor.

The specific implementation of the steps in the program 632 refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

When the functions are implemented in a form of a software functional unit and sold or used as an independent product, the functions may be stored in a computer-readable storage medium. Based on such an understanding, the technical solutions of the present disclosure essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present disclosure. The foregoing storage medium comprises: any medium that can store program code, such as a USB flash drive, a removable hard disk, a read-only memory (ROM), a random access memory (RAM), a magnetic disk, or an optical disc.

The above implementations are only used to describe the present disclosure, rather than limit the present disclosure. Various alterations and variants can be made by those of ordinary skill in the art without departing from the spirit and scope of the present disclosure, so all equivalent technical solutions also belong to the scope of the present disclosure, and the scope of patent protection of the present disclosure should be defined by claims.

What is claimed is:

1. A managing method for a sensor access authority, applicable to user equipment, comprising:

in response to forbiddance of an access authority of an application program to a first sensor of the user equipment, determining a second sensor of the user equipment corresponding to the first sensor based on a predetermined corresponding relation between the first sensor and the second sensor, wherein the second sensor has a type different from the first sensor and collects data that is at least partially overlapped with data collected by the first sensor; and forbidding access of the application program to the data collected by the second sensor based on a sampling rate higher than a first threshold value and a sampling precision higher than a second threshold value, wherein the first threshold value is varied depending on a quantity of third sensors of the user equipment that are of a same type as the type of the second sensor, wherein the first threshold value decreases as the quantity of the third sensors increases.

2. The method according to claim 1, wherein the forbiddance of the access authority of the application program to the first sensor comprises:

forbidding access of the application program to the data collected by the first sensor.

3. The method according to claim 1, further comprising:

reducing the sampling rate of the data collected by the second sensor to be smaller than or equal to the first threshold value.

4. The method according to claim 1, further comprising:

reducing the sampling precision of the data collected by the second sensor to be smaller than or equal to the second threshold value.

5. The method according to claim 1, wherein the first sensor comprises a microphone and the second sensor comprises a gyroscope.

6. The method according to claim 1, wherein the first sensor comprises a fingerprint sensor and the second sensor comprises an image sensor.

7. The method according to claim 1, wherein the first sensor comprises a depth sensor and the second sensor comprises an antenna.

8. A non-transitory computer-readable storage medium configured with instructions executable by one or more processors to cause the one or more processors to perform operations comprising:

a determining, in response to forbiddance of an access authority of an application program to a first sensor of the user equipment, a second sensor of the user equipment corresponding to the first sensor based on a predetermined corresponding relation between the first sensor and the second sensor, wherein the second sensor has a type different from the first sensor and collects data that is at least partially overlapped with data collected by the first sensor; and forbidding access of the application program to the data collected by the second sensor based on a sampling rate higher than a first threshold value and a sampling precision higher than a second threshold value, wherein the first threshold value is varied depending on a quantity of third sensors of the user equipment that are of a same type as the type of the second sensor, wherein the first threshold value decreases as the quantity of the third sensors increases.

9. User equipment, comprising:

a plurality of sensors;

a memory, configured to store an instruction; and a processor, configured to execute the instruction stored by the memory, wherein the instruction causes the processor to perform operations including:
- in response to forbiddance of an access authority of an application program to a first sensor of the plurality of sensors of the user equipment,
- determining a second sensor of the plurality of sensors of the user equipment corresponding to the first sensor based on a predetermined corresponding relation between the first sensor and the second sensor, wherein the second sensor has a type different from the first sensor and collects data that is at least partially overlapped with data collected by the first sensor; and
- forbidding access of the application program to the data collected by the second sensor based on a sampling rate higher than a first threshold value and a sampling precision higher than a second threshold value, wherein the first threshold value is varied depending on a quantity of third sensors of the plurality of sensors of the user equipment that are of a same type as the type of the second sensor; wherein the first threshold value decreases as the quantity of the third sensors increases.

10. The user equipment according to claim 9, wherein the operations further include: reducing the sampling rate of the data collected by the second sensor to be smaller than or equal to the first threshold value.

11. The user equipment according to claim 9, wherein the operations further include: reducing the sampling precision of the data collected by the second sensor to be smaller than or equal to the second threshold value.

12. The user equipment according to claim 9, wherein the first sensor comprises a microphone and the second sensor comprises a gyroscope.

13. The user equipment according to claim 9, wherein the first sensor comprises a fingerprint sensor and the second sensor comprises an image sensor.

14. The user equipment according to claim 9, wherein the first sensor comprises a depth sensor and the second sensor comprises an antenna.

* * * * *